E. VON OREL AND W. SANDER.
STEREOISOHYPSOGRAPH.
APPLICATION FILED DEC. 2, 1920.
1,436,220. Patented Nov. 21, 1922.
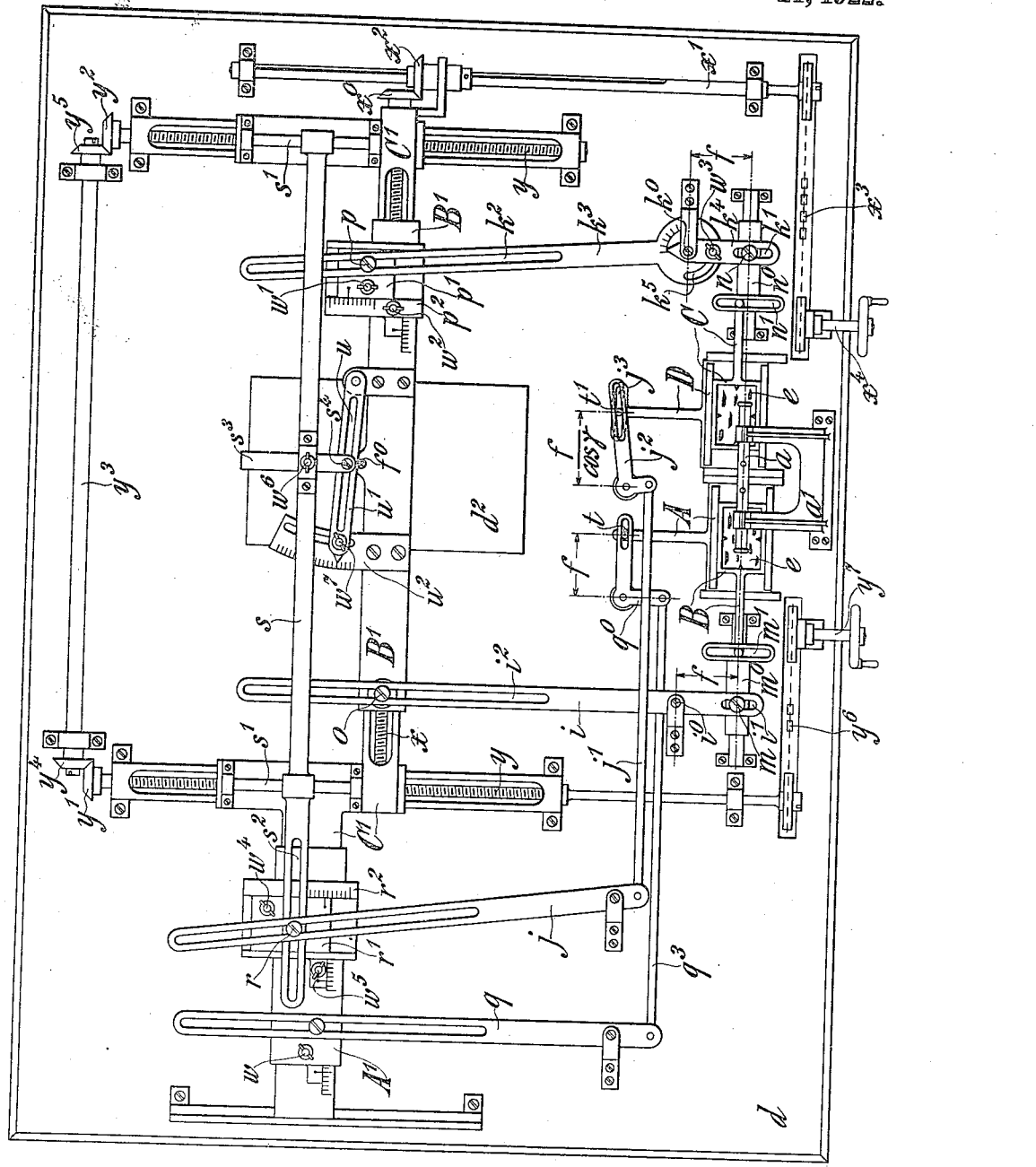
Inventors:
E. von Orel
Willy Sander Patented Nov. 21, 1922.

1,436,220

UNITED STATES PATENT OFFICE.

EDUARD von OREL AND WILLY SANDER, OF JENA, GERMANY, ASSIGNORS TO THE FIRM OF CARL ZEISS, OF JENA, GERMANY.

STEREOISOHYPSOGRAPH.

Application filed December 2, 1920. Serial No. 427,865.

*To all whom it may concern:*

Be it known that we, EDUARD VON OREL, a citizen of the Kingdom of Italy, and WILLY SANDER, a citizen of the German Empire, both residing at Jena, Germany, have invented a new and useful Stereoisohypsograph, of which the following is a specification.

The present invention relates to a device which permits of copying on a plane surface the surface of a spatial image to be obtained from a photostereogram, and in particular, elements of this surface designated height-lines and which device is equipped for this purpose with a comparator system comprising a binocular double microscope with two marks, yielding a stereoscopic mark-image, and a slide system, and which is positively connected with a copying system, consisting of spatial cross-slide system carrying the tool, in such a way that the position of the tool-point relatively to the copy-carrier corresponds at any one time to the position of that point of the object-surface, the images of which are seen in the comparator system as coinciding with its two marks.

Such devices are already known so far as utilization of a photostereogram is concerned, at the taking of which the axes of the objectives were horizontal. In these known devices the slide system of the comparator system comprises four slides. Two of the latter serve for effecting a relative displacement of the microscope and the photograms in the height-direction of the photograms, whilst the two others adjust the relative displacement of the photograms and the microscope in the breadth-direction of the photograms.

The cross-slide system contains three slides, the one of which is displaceable on a fixed base-plate in the depth-direction of the copy-carrier, whilst the two others are displaceable beside each other on the said first slide in the breadth-direction of the copy-carrier. Three out of the four slides of the comparator system are coupled to the cross-slide system by means of a lever system.

According to the present invention also the fourth slide (D) of the comparator system, displaceable in the height-direction of the photograms, is coupled to the cross-slide system so that the operation of the device is simplified.

If the device be intended for utilizing such photograms at the taking of which the base-line was inclined to the horizontal plane, and the objective axes were horizontal, parallel to one another and perpendicular to the base-line, the point of application ($r$) of the lever ($j$) connected to the said fourth slide (D) of the comparator system is so disposed as to be adjustable in the breadth-direction of the copy-carrier relatively to that slide ($A^1$) of the cross-slide arrangement which contains this point.

If it be desired to also utilize photograms at the taking of which the said last assumption, viz that the objective axes were parallel to the base-line did not hold good, whereas the other assumptions hold good, and if the points of application of the two levers of the cross-slide system, connecting the two slides (A and D) of the comparator system, displaceable in the height-direction of the photograms, with the cross-slide system, belong to one and the same slide ($A^1$), the aforesaid point of application ($r$), adjustable relatively to this slide ($A^1$) in the breadth-direction of the copy-carrier, will, in addition, be so disposed as to be adjustable relatively to this slide ($A^1$) in the depth-direction of the copy-carrier.

If the device shall furthermore permit of utilizing such photograms at the taking of which, in addition, the assumption that the objective axes were parallel to one another did not hold good, then the said adjustable point of application is coupled to that slide ($B^1$) of the cross-slide system with which the two slides (B and C) of the comparator system, displaceable in the breadth-direction of the photograms, are coupled, in such a manner that a displacement of the latter slide in the breadth-direction of the copy-carrier results in a displacement of the said point in the depth-direction.

The annexed drawing shows a constructional form in plan of a device corresponding to the present invention for copying height-lines on a drawing surface.

On a base-plate $d$ there is fixed by means of a support $a^1$ a binocular double microscope $a$, containing a mark in each of both its image-planes. The microscope $a$ serves for the stereoscopic observation of two photograms $e$, each of which is carried by a two-membered cross-slide system A, B, C and D respectively. The lower slides A and D are displaceable on the base-plate $d$ perpendicularly to the base-line of the microscope $a$, whilst the direction of displacement of the upper slides B and C is parallel to the base-line of the microscope. The base-plate $d$ carries in addition a cross-slide system, comprising three slides $A^1$, $B^1$ and $C^1$. The slide $C^1$ is displaceably disposed on the base-plate $d$ in the direction of displacement of the slide A. The slides $A^1$ and $B^1$ are displaceable on the slide $C^1$ in the same direction as the slides B and C on the appertaining slides A and D. The slide $A^1$ can be fixed on the slide $C^1$ by means of a set screw $w$. The position adjusted at any one time can be read off on an indicating device. The slide $B^1$ is displaceable by means of a screw-spindle $x$ which is actuated from a grooved shaft $x^1$ by a bevel wheel $x^0$ and a bevel wheel $x^2$, displaceable along the said grooved shaft $x^1$ and coupled to the slide $C^1$ by means of a driver. The shaft $x^1$ is actuated by a hand-wheel $x^4$ accessible to the right hand of the observer the motions of this hand-wheel being transmitted to the shaft $x^1$ by a chain-drive $x^3$. The slide $B^1$ carries a drawing pencil $f^0$; the appertaining drawing board $d^2$ is fastened on the base-plate $d$. The slide $C^1$ is displaced by two screw spindles $y$, the left one of which is actuated by a hand-wheel $y^7$, disposed on the left side of the observer and coupled to this spindle by means of a chain drive $y^6$, whilst the right one is actuated from the left spindle by two pairs of bevel wheels $y^1$, $y^4$ and $y^2$, $y^5$ as well as a shaft $y^3$.

The slides A and $A^1$ are connected with each other by means of a double lever $q$, a rod $q^3$ and a cranked lever $q^0$. The double lever $q$ and the cranked lever $q^0$ are rotatably supported on the base-plate $d$ in such a way that their axes of rotation lie in a plane parallel to the base-line of the microscope. In addition, the arm of the cranked lever $q^0$ acting on the rod $q^3$ is parallel to the arm of the double lever $q$ acting on the same rod. The other arm of the cranked lever acts by means of a slit on a stud $t$ of the slide A which is to be assumed as being adjustable on the slide A parallelly to the base-line of the microscope $a$.

The slides D and $A^1$ are connected to each other by means of a double lever $j$, a rod $j^1$ and a cranked lever $j^2$. The double lever $j$ and the cranked lever $j^2$ are rotatably supported on the base-plate $d$ in such a manner that their axes or rotation lie in the same plane as the axis of rotation of the double lever $q$ and that of the cranked lever $q^0$. The arm of the cranked lever $j^2$ acting on the slide D is provided with a slit $j^3$ in which engages a stud $t^1$ of the slide D which is to be assumed as being adjustable on this slide parallelly to the base line of the microscope $a$. The arm of the double lever $j$ acting on the slide $a^1$ acts by means of a slit on a stud $r$, disposed on the upper slide $r^1$ of a cross-slide which is adjustable in the direction of displacement of the slide $C^1$, and the lower slide $r^2$ of which is adjustably disposed on the slide $A^1$ in the direction of displacement of this slide. The slide $r^1$ can be fixed on the slide $r^2$ by means of a set screw $w^4$ and the slide $r^2$ on the slide $a^1$ by means of a set screw $w^5$.

The slides B and $B^1$ are connected with one another by means of a double lever $i$ which is rotatably supported on the base-plate $d$ about an axis $i^0$. The one arm of the double lever acts by means of a slit $i^2$ on a stud $o$ of the slide $B^1$ in which case the component of the distance of this stud from the axis of rotation $i^0$, falling into the direction of displacement of the slide $c^1$, is equal to the corresponding component of the axis of rotation of the lever $q$ from the stud of the slide $A^1$, acting on this lever. The other arm of the double lever $i$ acts by means of a slit $i^1$ on a stud $m$ of an intermediate slide $m^0$ displaceable in the direction of displacement of the slide $b$, which contains a transverse link $m^1$ in which engages a stud of the slide B.

The slides C and $B^1$ are connected with each other by means of a double lever $k^3$, $k^4$ which is rotatably supported on the base-plate $d$ about an axis $k^0$ which lies with the axis of rotation $i^0$ in a plane parallel to the direction of displacement of the slide B. The two arms $k^3$ and $k^4$ of the double lever $k^3$, $k^4$ are adjustable relatively to each other, for which purpose the arm $k^3$ is provided with an arc-guide $k^5$ along which the arm $k^4$ is movable. The fixing is effected by means of a screw $w^3$. The arm $k^4$ acts by means of a slit $k^1$ on a stud $n$ of an intermediate slide $n^0$ displaceable in the direction of displacement of the slide C which contains a transverse link $n^1$ in which engages a stud of the slide C. The other arm $k^3$ acts by means of a slit $k^2$ on a stud $p$. This stud is disposed upon the upper slide $p^1$, adjustable in the direction of displacement of the slide $C^1$, of a cross-slide system, the lower slide $p^2$ of which is adjustable on the slide $B^1$ in the direction of displacement of the latter. A set screw $w^1$ serves for fixing the slide $p^1$ on the slide $p^2$ and by means of a set screw $w^2$ the slide $p^2$ may be fixed on the slide $B^1$.

In order that during copying, on the slide $B^1$ being displaced in the breadth-direction, a displacement in the depth-direction is imparted to the stud $r$, the following coupling between the stud and the slide $B^1$ is provided. On the slide $C^1$ a slide $s$ is disposed, which is displaceable along two guides $s^1$ in a direction parallel to the direction of displacement of the slide $C^1$. This slide $s$ on the one hand contains a slot $s^2$, which is parallel to the breadth-direction and in which the stud $r$ engages, on the other hand, on this slide a bar $s^3$ may be clamped by means of a screw $w^6$. This bar engages by means of a pin $s^4$ in a slot $u$ of a lever $u^1$, which is rotatable parallel to the drawing plane $d^2$ about a pin belonging to the slide $B^1$, and by means of a clamping screw $w^7$ may be fixed along a graduated bar $u^2$, which is fixed to the slide $B^1$.

Let it be assumed that during the exposure there was the most common case, i. e. that, although the objective axes were horizontal, a triangle was formed by the ground plan projections of the objective axes and the base-line. In order to be able to trace a height-line from a photostereogram taken in such a way, which height-line represents the ground plan projection of a height-layer, the height of which above the left hand objective has the value Y, it is requisite to adjust the device as follows. The components of the distances of the stud $m$ from the axis of rotation $i^0$ and of the stud $n$ from the axis of rotation $k^0$, falling into the direction of displacement of the slide A, have the value $f$. The components of the distances of the stud $t$ from the axis of rotation of the cranked lever $q$ and of the stud $t^1$ from the axis of rotation of the cranked lever $j^2$, falling into the direction of displacement of the slide B, have the value $f$ and $\dfrac{f}{\cos \delta}$ respectively. The arms $k^3$ and $k^4$ of the double lever $k^3, k^4$ embrace the angle $180 + \delta$, reckoned clockwise from the arm $k^3$. The slide $p^1$ is displaced from its zero-position in which the studs $p$ and $o$ lie in a plane containing the direction of displacement of the slide $B^1$, by the value $b \sin \alpha \cos \varepsilon$, measured by the copying scale, whilst the displacement of the slide $p^2$ from its zero-position in which, at the simultaneous zero-position of the slide $p^1$, the arm $k^3$ is parallel to the double lever $i$ has the value $b \cos \alpha \cos \varepsilon$, measured by the copying scale. The lever $n^1$ embraces with the direction of displacement of the slide $B^1$ the angle $\delta$. The slide $r^1$ is displaced from its zero-position in which, if $\delta = 0$, the stud $r$ lies with the stud of the slide $A^1$ acting on the lever $q$ in a plane falling into the direction of displacement of the slide $A^1$, by the value $$\frac{b \cos \varepsilon \sin (\alpha + \delta)}{\cos \delta},$$

measured by the copying scale, whilst the displacement of the slide $r^2$ from its zero-position in which, at the simultaneous zero-position of the slide $r^1$ and, if $\delta = 0$, the levers $q$ and $j$ are parallel, has the value $b \sin \varepsilon$, measured by the copying scale. The slide $A^1$ is displaced from its zero-position in which the lever $q$ is parallel to the direction of displacement of the slide $C^1$, by Y.

In that case the following lettering has been adopted:

$b$: connecting line of the objectives (base-line).

$f$: focal length of the objectives.

$\alpha$: angle of inclination of the left hand objective axis with respect to the perpendicular to the base-line, measured in the horizontal projection.

$\delta$: angle of relative inclination of the two objective axes, measured in the horizontal projection.

$\varepsilon$: angle of inclination of the base-line with respect to the horizontal plane.

In order to use the device, the observer looking into the double microscope $a$, the set screw $w^4$ being loosened but all the other set screws being tightened, must actuate the said device by means of the hand wheels $w^4$ and $y^7$ in such a way that the stereoscopic mark-image is guided along the stereoscopic object-image. In that case the drawing pencil $f^0$ traces on the drawing board $d^2$ the height-line corresponding to the height Y adjusted on the indicating device of the slide $A^1$.

We claim:

1. The combination of a stereo-comparator comprising four interdependent slides, A, B, C and D, a drawing device comprising three interdependent slides, $A^1$, $B^1$ and $C^1$, of which slides $A^1$ and $B^1$ are carried by slide $C^1$, means for positively coupling the slides of the said stereo-comparator with those of the said drawing device and a system of actuating devices controlling the said stereo-comparator and the said drawing-device, the said system being accessible to the operator while the latter is looking into the stereo-comparator.

2. The combination of a stereo-comparator comprising four interdependent slides A, B, C and D, a drawing device comprising three interdependent slides $A^1$, $B^1$ and $C^1$, of which slides $A^1$ and $B^1$ are carried by slide $C^1$ adjacent to each other, and a tool carried by the slide $B^1$, the direction of displacement of the slide $A^1$ coinciding with that of the slide $B^1$, four levers for positively coupling the slides of the said stereo-comparator with those of the said drawing device, one of these levers serving for coupling the slide D with the drawing device and having its point of application on the drawing device adjustable in the direction of displacement of the slide $A^1$, and a system of actuating devices controlling the said stereo-comparator and the said drawing device, the said system being accessible to the operator while the latter is looking into the stereo-comparator.

3. The combination of a stereo-comparator comprising four interdependent slides

A, B, C and D, a drawing device comprising three interdependent slides $A^1$, $B^1$ and $C^1$, of which slides $A^1$ and $B^1$ are carried by slide $C^1$ adjacent to each other, and a tool carried by the slide $B^1$, the direction of displacement of the slide $A^1$ coinciding with that of the slide $B^1$, four levers for positively coupling the slides of the said stereo-comparators with those of the said drawing device, two of these levers serving for coupling the slides A and D with the slide $A^1$, of which two levers one has its point of application on the drawing device adjustable in the direction of displacement of the slides $B^1$ and $C^1$ respectively and a system of actuating devices controlling the said stereo-comparator and the said drawing device, the said system being accessible to the operator while the latter is looking into the stereo-comparator.

4. The combination of a stereo-comparator comprising four interdependent slides A, B, C and D, a drawing device comprising three interdependent slides $A^1$, $B^1$ and $C^1$, of which slides $A^1$ and $B^1$ are carried by slide $C^1$ adjacent to each other, and a tool carried by the slide $B^1$, the direction of displacement of the slide $A^1$ coinciding with that of the slide $B^1$, four levers for positively coupling the slides of the said stereo-comparator with those of the said drawing device, two of these levers serving for coupling the slides A and D with the slide $A^1$, this latter slide carrying a two-member cross slide, the lower member of which is displaceable in the direction of displacement of the slide $A^1$ while the upper one is displaceable in the direction of displacement of the slide $C^1$, means for coupling the said upper member with the slide $B^1$ in such a manner that on the slide $B^1$ moving in its direction of displacement this upper member gets a movement in the direction of displacement of the slide $C^1$, and a system of actuating devices controlling the said stereo-comparator and the said drawing device, the said system being accessible to the operator while the latter is looking into the stereo-comparator.

EDUARD von OREL.
WILLY SANDER.

Witnesses:
PAUL KRÜGER,
FRITZ SANDER.